Jan. 29, 1952 G. L. HARPER 2,584,014
TRUCK TOP
Filed Feb. 2, 1948 2 SHEETS—SHEET 1
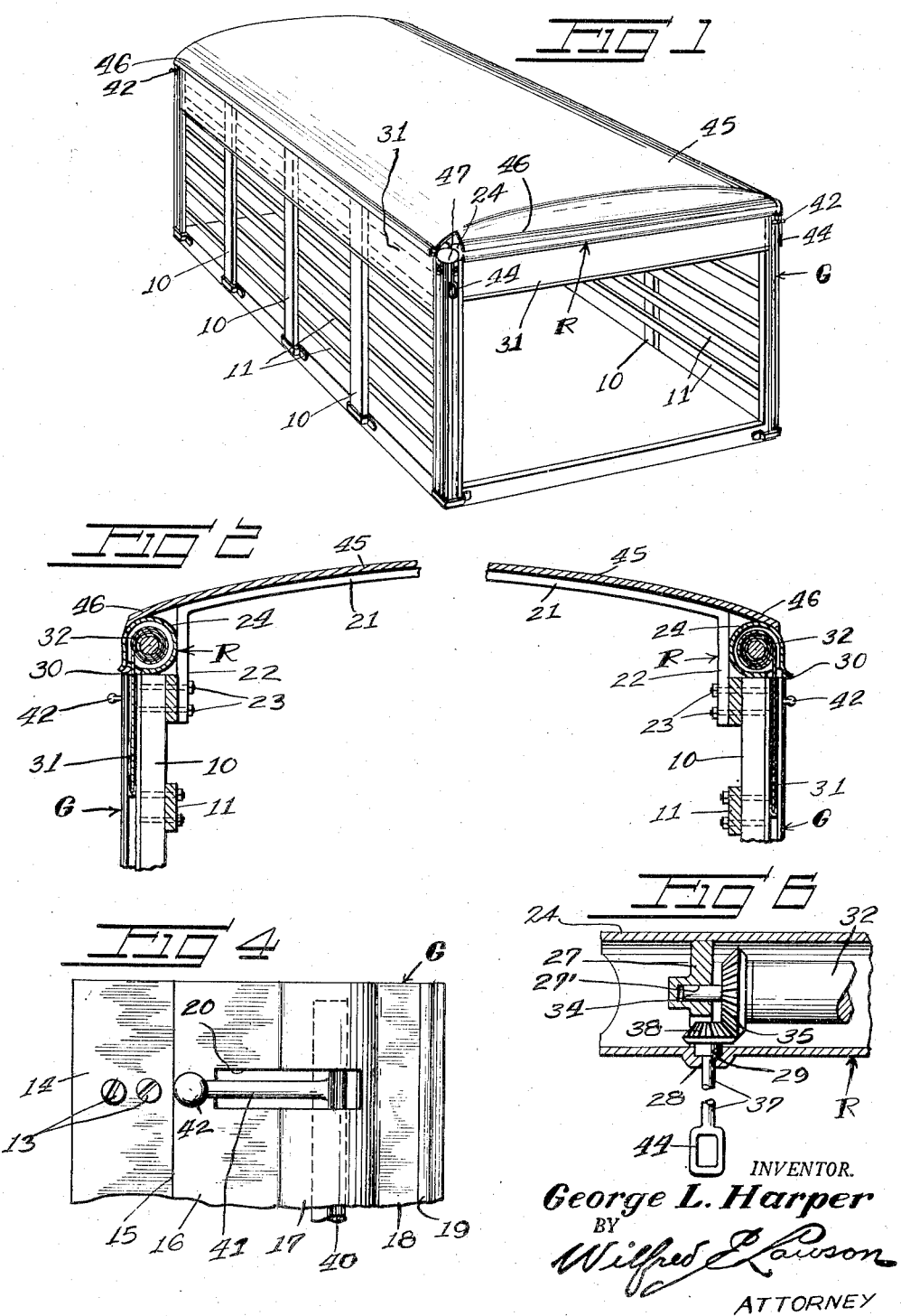
INVENTOR.
George L. Harper
BY
Wilfred Lawson
ATTORNEY Jan. 29, 1952 G. L. HARPER 2,584,014
TRUCK TOP
Filed Feb. 2, 1948 2 SHEETS—SHEET 2
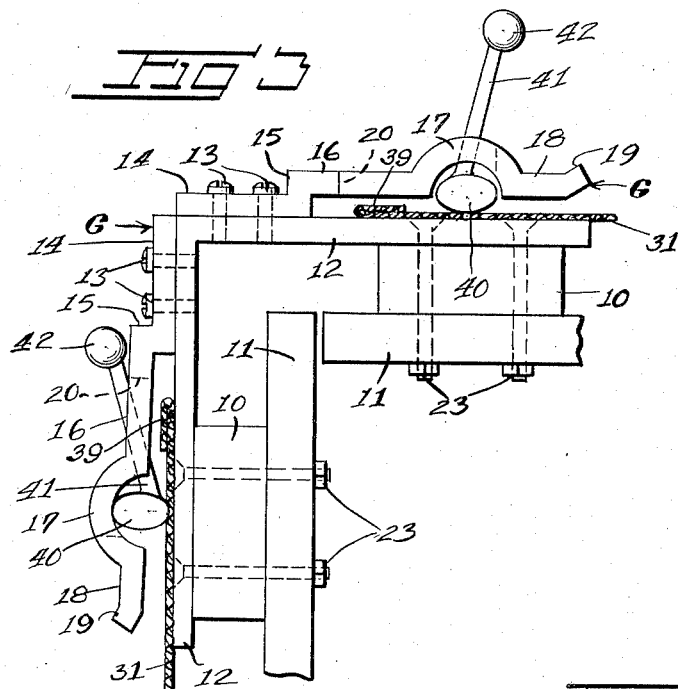
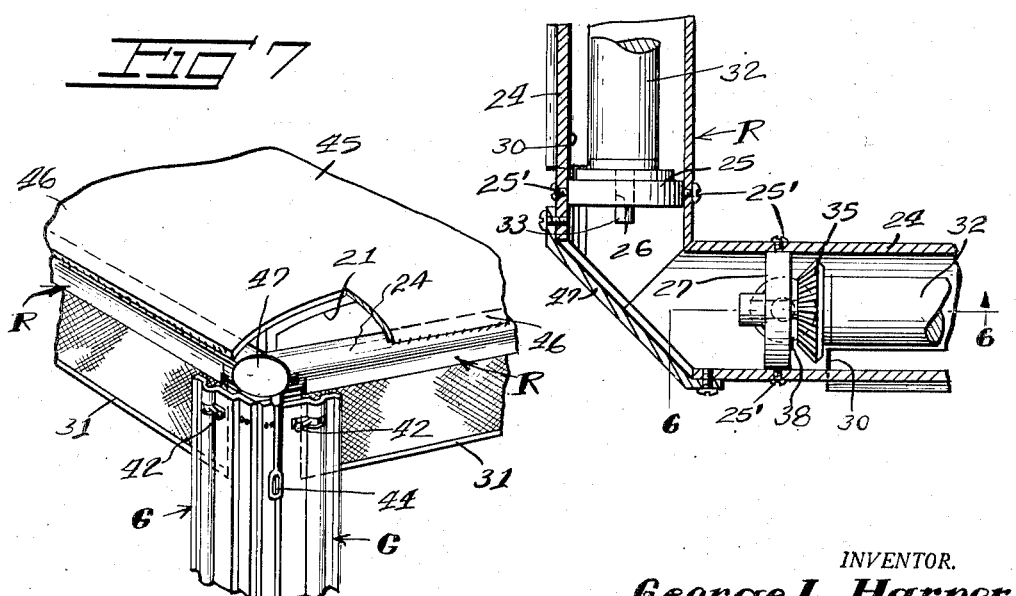
INVENTOR.
*George L. Harper*
BY
*Wilfred E. Lawson*
ATTORNEY

Patented Jan. 29, 1952

2,584,014

UNITED STATES PATENT OFFICE 2,584,014

TRUCK TOP

George L. Harper, La Cygne, Kans.

Application February 2, 1948, Serial No. 5,771

3 Claims. (Cl. 296—137)

My invention relates to truck tops and more particularly to truck tops adapted to be removed from the truck.

The object of my invention is to provide a truck top of the character indicated above consisting of a frame work supporting a permanent roof and equipped with roller curtains made from canvas or the like and adapted to cover and close the open sides and front and rear ends of the frame.

Another object of my invention is to provide a truck top of the character indicated above equipped on each corner of the frame with a metal corner construction providing a guide slot for the edges of the curtains during their upward or downward movements.

A further object of my invention is to provide a truck top of the character indicated above, the metal corners of which support horizontal clamp rods adapted to engage and secure the roller curtains in position at any desired level.

A still further object of my invention is to provide a truck top of the character indicated above equipped with means for rolling the several roller curtains up in order to open the sides and front and rear ends of the frame of the top.

Other objects of my invention not specifically mentioned may appear in the following specification describing my invention with reference to the accompanying drawing illustrating a preferred embodiment of my invention. It is, however, to be understood that my invention is not to be limited or restricted to the exact construction and combination of parts described in the specification and shown in the drawing, but that such changes and modifications may be made which fall within the scope of the claims appended hereto.

In the several figures of the drawing similar parts are designated by similar reference characters and Figure 1 is a view in perspective of a top constructed in accordance with an embodiment of the invention;

Figure 2 is a fragmentary cross sectional view;

Figure 3 is an enlarged fragmentary view in top plan of a corner portion with the roof removed;

Figure 4 is an enlarged fragmentary view in elevation of the upper portion of a guide member herein embodied;

Figure 5 is an enlarged fragmentary view partly in horizontal section and partly in top plan of adjacent housings;

Figure 6 is a sectional view taken substantially on the line 6—6 of Figure 5; and Figure 7 is an enlarged fragmentary view in perspective of a corner portion of the top.

The truck top forming the subject matter of my invention comprises vertical stakes 10 adapted to be removably secured to the body of a truck (not shown) in any conventional manner, so that two of these stakes are located on each side adjacent to the corners of the truck, two on the front and two on the rear end thereof. A plurality of horizontal frame members 11 are secured to the inner surfaces of each pair of stakes located on the same side or end of the truck, the uppermost horizontal frame members being arranged on the stakes, so that their upper edges are located at the same level as the upper ends of the stakes. A metal corner post is removably secured on each pair of adjacent stakes 10 at each corner of the top and consists of an angular bar member 12 having each flange extending approximately six inches each way from the corner, and extending upwardly over the entire length of the stakes. On each leg of the angular member 12 a guide member G is removably mounted adjacent the apex of the angular member by means of screws 13 extending through a flat end portion 14 of the guide member G. At the inner edge of this flat end portion, the guide member is offset outwardly at a right angle as shown at 15 and extends then at a distance from and parallel to the corresponding leg of the angular member 12, as shown at 16. On the edge of the portion 16 of the guide member G, an arcuate portion 17 is formed so that the outer surface of this portion is convex, and from this arcuate portion a straight portion 18 extends, which has an outwardly bent edge portion 19. The straight portion 18 is arranged, so that it forms a continuation of the portion 16 of the guide member. Adjacent the upper and the lower ends of the guide member a horizontal slot 20 is provided in each of said members for a purpose to be described later. This slot extends over the bigger part of the guide member portion 17 and the bigger part of the arcuate guide member portion.

A roof rib or bow 21 extends transversely of the top between the foremost and rearmost stakes 10. On each end of each bow 21 a vertically downwardly extending part 22 is provided, which is removably secured to the inside surfaces of the uppermost horizontal frame members 11 by means of bolts or screws 23.

On each longitudinal and transverse side of the top, a roller curtain construction R is provided and comprising a substantially cylindrical housing consisting of a tubular body 24 resting on and secured in any preferred conventional manner to the tops of the corresponding stakes 10. The metal corner angles 12 abut these tubular bodies, the ends of which are beveled to fit onto each other at right angles. The other portions of the abutting ends of the tubular members are cut away at an angle of approximately 135°, providing open ends on each tubular member 24. A bearing disk 25 is inserted in one end of each tubular member and is removably secured in position by means of screws 25' or the like. Each disk is provided with a centrally located bearing hole 26 for a purpose to be described later. In the other end portion of each tubular member 25, another bearing disk 27 is removably secured and is provided with a central hole 27'. On the lower portion of each bearing disk 27, a plate-like projection 28 is formed extending toward the adjacent corner of the top and a bearing hole 29 is provided centrally in said projection. A longitudinal slot 30 is provided in each tubular body 24 outwardly of the lowermost portion thereof.

A curtain 31 made from canvas or the like is secured to a roller 32 equipped at one end with a comparatively short axle pin 33 arranged rotatably in the bearing hole 26 in each bearing disk 25. At the other end each roller 32 is provided with a longer axle pin 34 rotatably supported in the second bearing hole 27' in the second bearing disk 27. A bevel gear 35 is rigidly mounted on the longer axle pin 34 and is located inside the housing next to the roller 32. A vertical shaft 37 extends through and is located rotatably in the bearing hole 29 in the projection 28. On the uppermost end portion of said shaft 37, a second bevel gear 38 is rigidly mounted and meshes with the first mentioned bevel gear 35. The free end of each curtain extends through the longitudinal slot 30 in the tubular body 24.

The edges of the roller curtains 31 are located in the spaces between the angular members 12 and the straight portions 16 of the guide members G, and said edges are reinforced as indicated at 39. An oval clamp rod 40 is oscillatingly located in each of the arcuate portions 17 of the guide members G and as actuating hand lever 41 extends through each of the slots 20 in the guide members. The inner end of each hand lever 41 is secured to the corresponding oval clamp rod 40 and a hand knob 42 is provided on the outer end of each hand lever.

When it is desired to move one of the roller curtains up or down, the hand lever 41 is pivoted inwardly so that the oval clamp rod 40 will be arranged in such a position that the long diameter of the rod extends parallel to the curtain as shown in the top part of the view forming Figure 3, and the curtain will be free to be moved up or down, as shown. When the curtain is to be secured in an adjusted position, the hand lever is thrown outwardly so that the long diameter of the clamp rod is arranged at right angles to the curtain. The clamp rod engages then the curtain and the arcuate guide member portion 17 and holds the curtain securely in position. To move the curtain 31 downwardly, it may be pulled down and to move it upwardly, the vertical shaft 37 is rotated by means of a handle 44 formed on said shaft.

When the curtains are secured in their lowermost position, the inside of the frame is safe from being damaged by rain, because the edges of the curtains are held firmly against the angular members over their entire length by the clamp rods 40.

A roof 45 of any preferred conventional construction is secured to and supported by the bows 21, and curved cover plates 46 are secured with their upper edges on said roof, and with their lower edges onto the housing of each roller construction R, so that rain is prevented from entering between the roof and said housing.

On each corner, formed by the tubular members 24, an inspection plate 47 is removably secured to said member in any conventional manner, so that the curtains, rollers, gears etc. in the tubular member may be accessible for repair or replacement.

I claim:

1. A removable truck top structure comprising a plurality of stakes, means for securing the same vertically at the sides and ends of a truck body, each corner of the truck body having two stakes adjacent thereto, a plurality of horizontal members secured to the inner surfaces of the stakes, roof bows disposed transversely of the structure between opposite top longitudinal horizontal members, each bow having a vertical end portion secured to a top horizontal member and extending a substantial distance above the same, a roof overlying said bows and projecting at its opposite longitudinal edges a substantial distance laterally beyond the vertical end portions of the bows to overlie the upper ends of stakes disposed along opposite longitudinal sides of the structure, said roof also projecting at its two ends a substantial distance beyond and over the top ends of the stakes at the ends of the structure, a tubular housing extending longitudinally of each side of the structure and transversely of the ends, each tubular housing being disposed between the projecting portion of the roof and the top ends of the underlying stakes, each of said tubular housing having a downwardly directed longitudinal slot, a roller curtain rotatably supported in each tubular housing and extending downwardly through the slot thereof, and means for securing each roller curtain at a vertical edge when the curtain is drawn downwardly through the housing slot.

2. A removable top structure for trucks, comprising a plurality of brackets secured along the opposite sides of the body of a truck, a stake removably supported vertically in each of said brackets, a plurality of vertically spaced longitudinal members secured on the inner sides of said stakes, a single stake bracketed adjacent each end of the opposite ends of the truck body, transverse bows extending between and secured to the uppermost of said longitudinal members, metal angle corner posts secured to the outer sides of the adjacent stakes at the corners of the truck body, a roof supported on said bows and having its edge portions overlying the upper ends of said stakes and posts, rigid housings extending longitudinally and transversely of the top structure and supported on the upper ends of said stakes and corner posts and beneath the edge portions of said roof, said housings having longitudinal downwardly opening slots, roller curtains mounted within said housings and adapted to be drawn downwardly over the outer sides of said stakes, and means carried by said corner posts for securing said curtains in lowered state.

3. A removable top structure for trucks, comprising a plurality of brackets secured along the opposite sides of the body of a truck, a stake removably supported vertically in each of said brackets, a plurality of vertically spaced longitudinal members secured on the inner sides of said stakes, a single stake bracketed adjacent each end of the opposite ends of the truck body, transverse bows extending between and secured to the uppermost of said longitudinal members, metal angle corner posts secured to the outer sides of the adjacent stakes at the corners of the truck body, a roof supported on said bows and having its edge portions overlying the upper ends of said stakes and posts, rigid housings extending longitudinally and transversely of the top structure and supported on the upper ends of said stakes and corner posts and beneath the edge portions of said roof, said housings having longitudinal downwardly opening slots, roller curtains mounted within said housings and adapted to be drawn downwardly over the outer sides of said stakes, and means carried by said corner posts for securing said curtains in lowered state, said means comprising a metal strip secured at one end horizontally on each of the outer sides of each of said corner posts and having its other end offset, said offset end being slotted, and a lever mounted in said slot for rocking motion to move its inner end into and out of clamping engagement with the adjacent edge portion of a curtain.

GEORGE L. HARPER.

REFERENCES CITED

The following references are of record in the file of this patent:

UNITED STATES PATENTS

| Number | Name | Date |
| --- | --- | --- |
| 595,228 | West | Dec. 7, 1897 |
| 855,721 | Moore et al. | June 4, 1907 |
| 879,218 | Tickerhoof | Feb. 18, 1908 |
| 1,365,084 | Bower | Jan. 11, 1921 |
| 1,398,307 | Thompson | Nov. 29, 1921 |
| 1,656,077 | Schlicher | Jan. 10, 1928 |
| 1,702,466 | Davis | Feb. 19, 1929 |
| 2,171,046 | Park | Aug. 29, 1939 |
| 2,324,508 | Johnson | July 20, 1943 |